United States Patent
Tao et al.

(10) Patent No.: US 7,544,627 B2
(45) Date of Patent: Jun. 9, 2009

(54) PRESSURE SENSING FABRIC

(75) Inventors: Xiao-ming Tao, Hong Kong (CN); Hui Zhang, Hong Kong (CN)

(73) Assignee: The Hong Kong Polytechnic University, Hong Kong Sar (CN)

( * ) Notice: Subject to any disclaimer, the term of this patent is extended or adjusted under 35 U.S.C. 154(b) by 28 days.

(21) Appl. No.: 11/127,142

(22) Filed: May 12, 2005

(65) Prior Publication Data

US 2006/0258247 A1 Nov. 16, 2006

(51) Int. Cl.
*D03D 15/00* (2006.01)
*D04B 1/14* (2006.01)
(52) U.S. Cl. .................. 442/189; 442/301; 442/308
(58) Field of Classification Search ............. 442/301, 442/189, 308
See application file for complete search history.

(56) References Cited

U.S. PATENT DOCUMENTS

2002/0134116 A1* 9/2002 Sandbach .................. 66/202

2003/0211797 A1* 11/2003 Hill et al. .................. 442/205

* cited by examiner

*Primary Examiner*—Jenna-Leigh Johnson
(74) *Attorney, Agent, or Firm*—Buchanan Ingersoll & Rooney PC (57) ABSTRACT

Existing pressure sensing fabrics may involve two portions, i.e., insulating and conductive portions in the fabric, which increases the complexity of the fabric system and more important, and the instablization of the resistance-strain relationship during dynamic deformation which limits the application fields due to intrinsic properties difference between the two portions. These fabrics commonly employ two or more layers to accomplish the detecting functions. Such arrangements increase the thickness, weight, and cost of the sensors with some other disadvantages such as low accuracy, instability, etc. This invention describes a pressure sensing fabric have a general structure as simple as a plurality of electrically conducting yarns forming interlocking loops of yarns. The pressure sensing fabric is found not only be able to sense pressure but also the magnitude of the pressure.

13 Claims, 13 Drawing Sheets

Two dimensional orthogonal bias intersecting

Figure 12a cycle intersecting

Three dimensional sphere

PRESSURE SENSING FABRIC

FIELD OF THE INVENTION

This invention relates to pressure sensing fabric.

BACKGROUND OF THE INVENTION

Using fabrics as strain and/or pressure sensors is desirable in many applications such as furniture, apparel, composites for vehicles, landscape, dams and highways as well as buildings. Advantages of fabric sensors are flexible, cost effective and ease in manufacturing and handling.

Textiles, whose electrical resistance changes under deformation, have been described previously. In U.S. Pat. No. 4,715,235, the change of the resistance of knitted or woven fabrics is mainly caused by the change of the ratio of the insulating portion to the conducting portion of the fibers at the intertwined regions in the fabric. This system involves two portions, i.e., insulating and conductive portions in the fabric, which increases the complexity of the fabric system and more important, and the instablization of the resistance-strain relationship during dynamic deformation which limits the application fields due to intrinsic properties difference between the two portions. In U.S. publication no. 20030119391, the inventors disclose a conductive pressure sensitive textile that is constructed by two orthogonally contacted filaments. The fabric can be used as a flexible switch to detect contacts on the fabric sheet. However, this system cannot measure the magnitude of the applied force accurately due to the filament yarn structure. In U.S. publication no. 20040252007, flexible switching devices are described comprising two self-supporting textile electrodes sandwiching a variably resistive element. In U.S. Pat. No. 4,659,873, fabric touch sensors are manufactured by two conductive fabric layers. These above two prior art documents (including other patents about capacitive touch sensors) commonly employ two or more layers to accomplish the detecting functions. Such arrangements increase the thickness, weight, and cost of the sensors with some other disadvantages such as low accuracy, instability, etc.

OBJECTS OF THE INVENTION

Therefore, it is an object of this invention to provide a pressure sensing fabric that may resolve or alleviate at least one or more of the problems as set forth in the prior art. As a minimum, it is an object of this invention to provide the public with a useful choice.

SUMMARY OF THE INVENTION

Accordingly, this invention provides a pressure sensing fabric including including at least one electrically conducting yarn, characterized in that the electrically conducting yarn forming interlocking rings. The yarns can be short fiber yarns or filament yarns. Preferably, each of the electrically conducting yarns forms interlocking rings.

Alternatively, the interlocking rings are formed by a collective strand of electrically conductive yarns, wherein the yarns orient substantially along a same direction. The fabric can have long stitch structure, double warp structure, net (mesh) structure, or fancy long stitch structure.

It is another aspect of this invention to provide a pressure and position sensing fabric a first plurality of electrically conducting fabrics including a plurality of electrically conducting yarns, said electrically conducting yarns forms into a matrix having a plurality of intersections; and intersects at predetermined known positions.

The pressure and position sensing fabric may have various topologies, including orthogonal, bias intersecting topology, cycle intersecting, and sphere.

Preferably, the pressure and position sensing fabric may further include a second plurality of insulating fabrics including insulating yarns. The first plurality of electrically conducting fabrics interlace with the second plurality of insulating fabrics. More preferably, each of the electrically conducting yarns forms interlocking rings.

BRIEF DESCRIPTION OF THE DRAWINGS

Preferred embodiments of the present invention will now be explained by way of example and with reference to the accompanying drawings in which:

FIG. 13 shows an enlarged view of the orthogonal intersecting system in FIG. 12a;

DETAILED DESCRIPTION OF THE PREFERRED EMBODIMENT

This invention is now described by way of example with reference to the figures in the following paragraphs.

Objects, features, and aspects of the present invention are disclosed in or are obvious from the following description. It is to be understood by one of ordinary skilled in the art that the present discussion is a description of exemplary embodiments only, and is not intended as limiting the broader aspects of the present invention, which broader aspects are embodied in the exemplary constructions.

This invention describes fabric strain or pressure sensors that are made of intrinsically electrical conductive staple yarns or textured continuous filament yarns, that have a textile structure such as knitted, woven, crocheted, plaited, braided, non-woven or embroidered fabric. The yarns are made of fibers, which can be short fibers or filaments.

These fabrics may be used as resistive strain sensors or pressure (tactile) sensors for single points or distributed pressure measurements utilizing their changes in the electrical resistance under mechanical deformations. The change in the electrical resistance of is caused by the change of the number of the contacting points at the contacting regions in the fabric, which changes the length of the electric current paths through the contacting regions under deformation. Multiple contacting points are created by special fiber assembly structure that will be described later. By selecting an appropriate fabric structure, the conductive fabric can serve as a current-flow path network, whose strain sensitivity, linearity, and strain range can be designed.

The fabric sensor of this invention may be used to measure deformation caused by lateral compression or tensile force in the plane of the fabric. It also can be used as pressure (tactile) mapping sensor measuring both the position of the applied force and its magnitude simultaneously.

The following are the major findings of this invention:
1. Fabric sensors that are made of staple yarns or textured continuous filament yarns made of intrinsically conductive fibers.
2. The number of fiber-fiber contact points is either predetermined or varies with the deformation that the sensor is subjected to.
3. Staple yarns having varying number of contact points are sensitive to axial strain or lateral compression deformation. The electrical resistance of the deformed yarn per unit length is related to both axial strain and lateral compression.
4. Textured continuous filament yarns having varying number of contact points are sensitive to lateral compression only. The electrical resistance of the deformed yarn per unit length is related to the yarn lateral compression, independent of axial strain.
5. Fabric structures facilitating the distribution of the multiple contact points and regions govern the strain sensitivity, linearity, and measurement range, etc of the fabric strain sensor.
6. Pure resistive single layer fabric pressure (tactile) mapping sensor making use of the multi-contacting structure can measure the pressure distribution, that is, position and magnitude of the deformation simultaneously perpendicular to the fabric sheet.
7. Electrode connection and wiring methods of the strain and pressure sensors are devised.
8. Lamination of the fabric sensors with elastomer protective sheath is devised.

Fibers

The fabrics wherein mentioned include knitted, woven, crocheted, braided, plaited, embroidered or non-woven fabric structure that assemble the multi-contacting structure yarns into a sheet like format. The materials used to construct the fabrics are intrinsically conductive fibers such as copper, nickel, silver, carbon fibers or man-made fibers (polyester, nylon, Kevlar, ceramic fibers) imparted electrical conductive properties by coating, co-extrusion, plating, ion/electron beam sputtering etc. with metallic or metal oxides, carbon powder or carbon nanotubes or organic conductive materials.

To create a multi-contacting structure at the contacting regions, the fiber in the yarn should be short (staple) fibers or filaments deformed by physical or chemical methods to improve the sensitivity and linearity of the sensor. The short fibers should be assembled in a compressible structure created by twisting of the yarn, distortion of the fibers or other methods that can obtain the same results. The fibers should have sufficient stability with respect to of temperature, moisture and chemical reactions. Corrosion resistance is also an important property. The fibers should also have acceptable bending, lateral compression and axial tensile strength, good elasticity and fatigue strength.

For mapping purpose, all types of natural or man-made non-electrically conducting fibers, such as polyester, nylon, cotton, silk, wool may be used as insulation fibers.

Yarns and Fabric Construction

Figure 1:
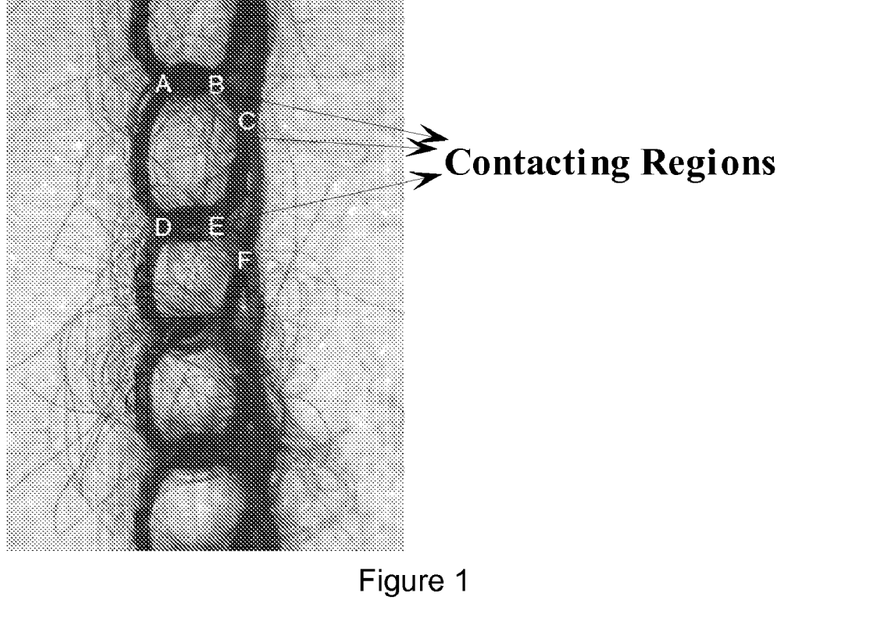
FIG. 1 shows the general structure of the yarns forming the pressure and/or strain sensing fabric of this invention.

The change of the electrical resistance of the fabric is caused by change of the resistance of the conductive yarn at the contacting points as shown in a representative fabric structure, i.e., single warp knitted fabric in FIG. 1. Each of the pressure and/or strain sensing fabrics of this invention is formed by a plurality of electrically conductive yarns. Each yarn, as generally understood, is basically a thread of material. The yarns of the pressure and/or strain sensing fabrics of this invention forms interlocking rings such that multiple contacting regions may be established among the yarns. Several different embodiments of such interlocking rings are described below. It should be noted that the interlocking rings may be formed by one yarn, or by several yarns.

Figure 2:
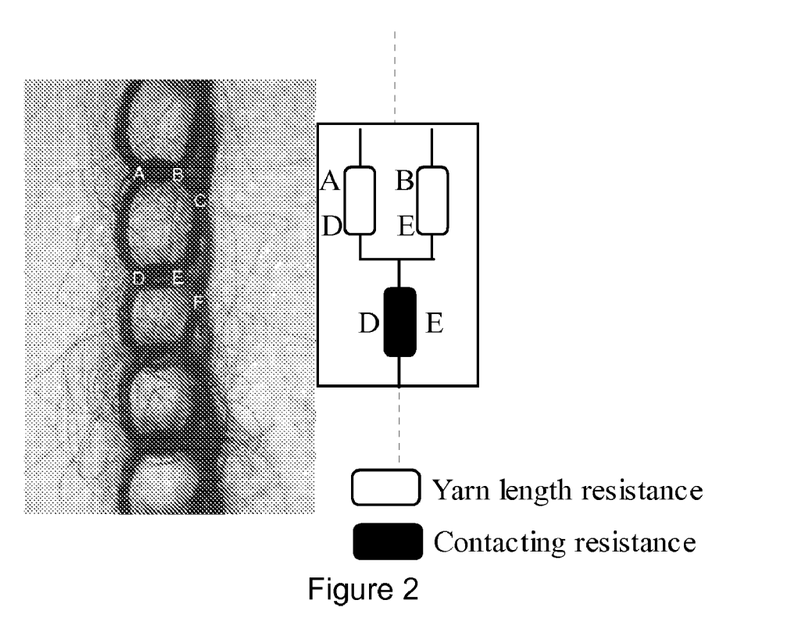
FIG. 2 shows the circuit simulating the conducting path of the fabric of FIG. 1.

In the fabric, there are numbers of these contacting regions caused by the interlocking loops forming the fabric body. Different fabric structure constructs different distributions of these contacting regions in the fabric. When a voltage is applied, the fabric serves as an electrical conductor transmitting the currents along the yarns in the fabric, which changes its resistance according to the magnitude of the load applied onto the fabric. The fabric can be simulated by a pure resistive network comprising length resistance and contacting resistance relating the intrinsic resistance of the yarns, and the contacting resistance of two contacting yarns at the contacting region, respectively in FIG. 2 (ignoring the lateral contacts).

Figure 3:
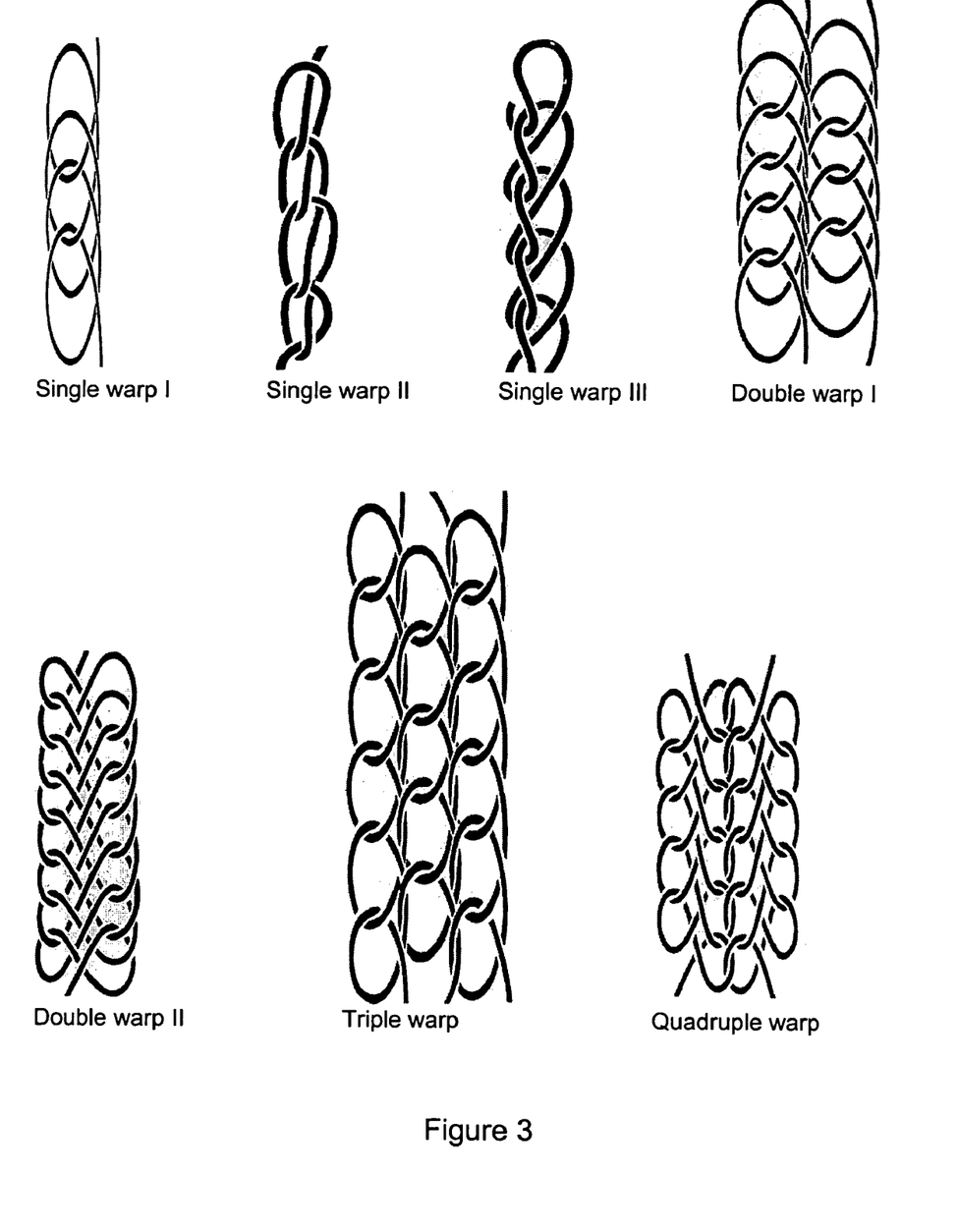
FIG. 3 shows different patterns of interlocking rings formed by a single yarn.

FIG. 3 shows different patterns of interlocking rings formed by a single yarn. As shown in FIG. 3, different size of rings may be formed, but the general requirement is that the ring must be closed. In here the term "closed ring" means a closed ring structure can be realized when the yarn is viewed from a certain angle. The "closed ring" has one point where the yarn intersects with itself. The "closed rings" may be interlocked with each other in various manners. For instance, the "rings" may interlock each other at the circumference, as shown in the single warps I and II. Alternatively, the rings may interlock each other in a manner as shown in the single warp III. The advantage of such interlocking rings structure is that the deformation of the fabric is mainly resulted from the change of the loops configurations (from circular to elliptical) instead of transforming the yarns. Therefore, stable contacts may be maintained in the fabric and the electric noise during the deformation of the fabric may be reduced.

Figure 4:
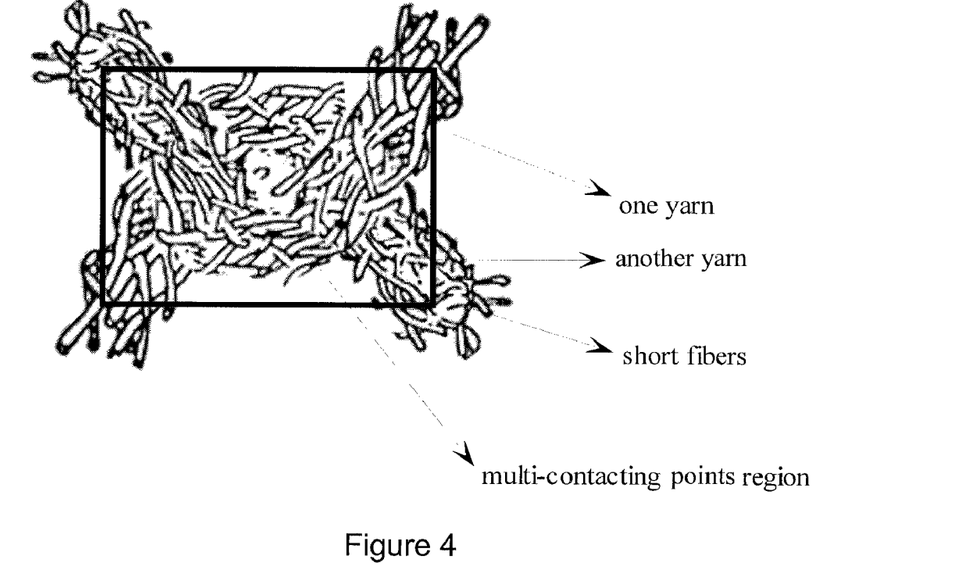
FIG. 4 shows the enlarged view of the multi-contacting region formed by short fibers yarns.
Figure 5:
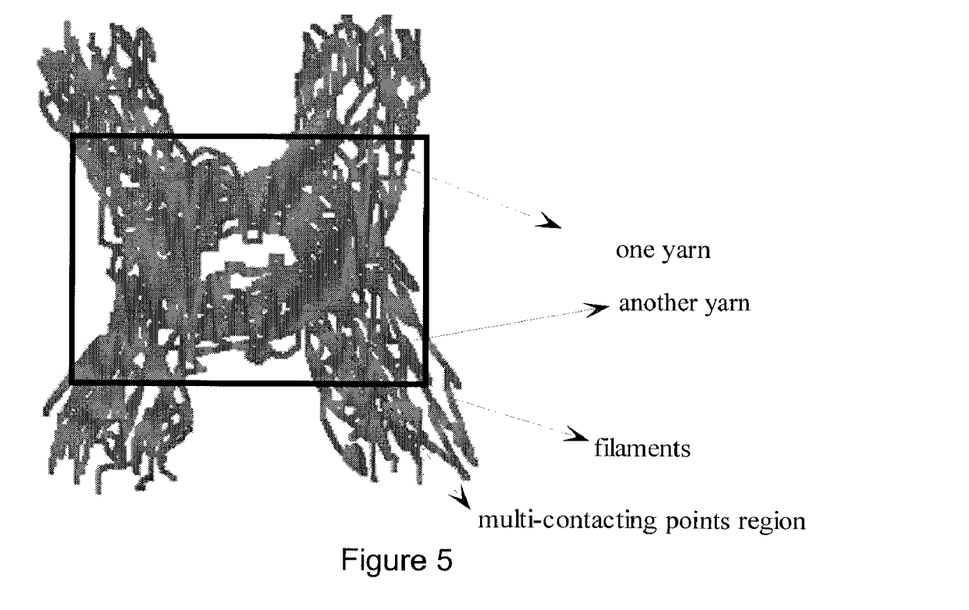
FIG. 5 shows the enlarged view of the multi-contacting region formed by short filament yarns.

When the fabric is under load, the length resistance and the contacting resistance change their values according the load on the fabric. The change of the length resistance is caused by the transformation of the yarns in the fabric and the change of the contacting resistance caused by the multi-contacting structure of the yarns at the contacting regions. Actually, the change of the fabric resistance is mainly caused by the change of the contacting resistance compared to the change of the length resistance. Therefore, in order to improve the sensitivity of the fabric sensor, the contacting structure of the yarns at the contacting regions should be designed to a multi-contacting structure in FIG. 4 by short fibers or FIG. 5 by textured filament yarn.

Figure 6:
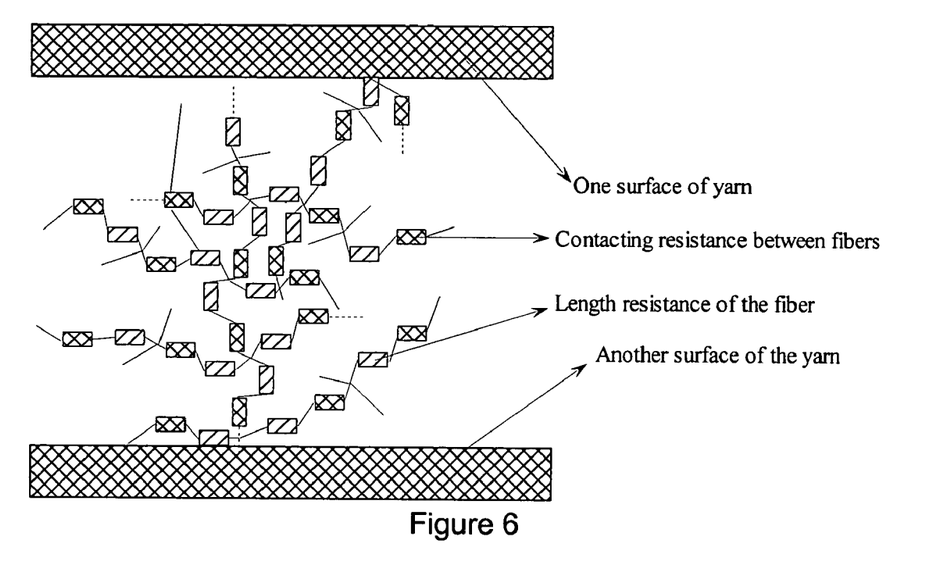
FIG. 6 shows the circuit simulating the conducting path of the multi-contacting region.
Figure 7A:
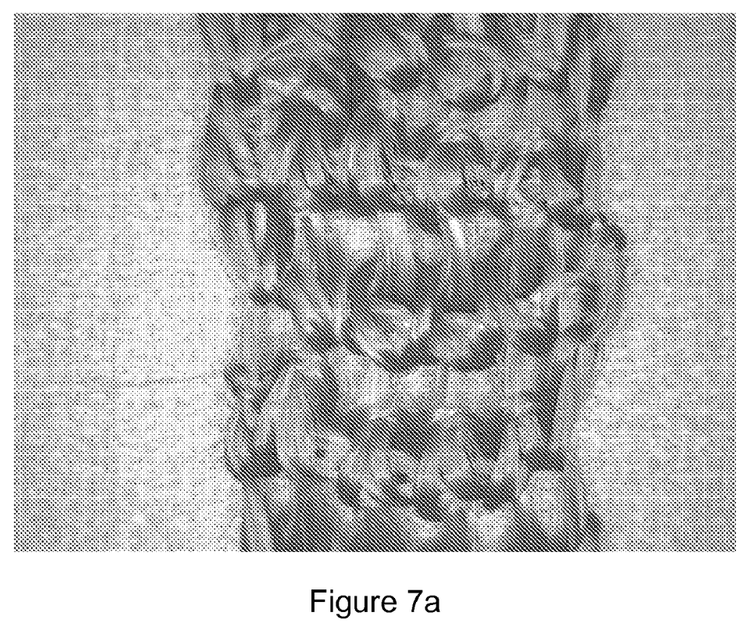
FIGS. 7a and 7b show the fabrics formed by filament yarn and stable yarn, respectively, in long stitch structure.
Figure 7B:
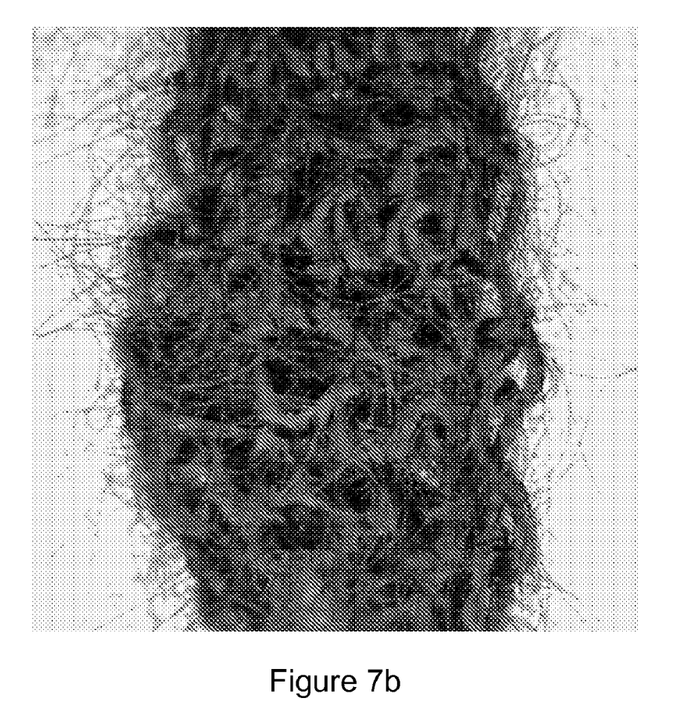
Figure 8A:
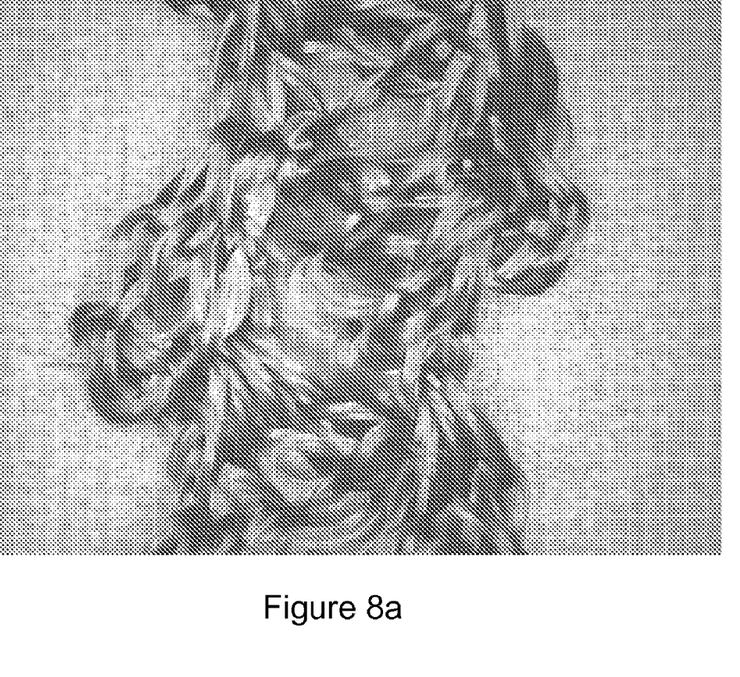
FIGS. 8a and 8b show the fabrics formed by filament yarn and stable yarn, respectively, in double warp structure.
Figure 8B:
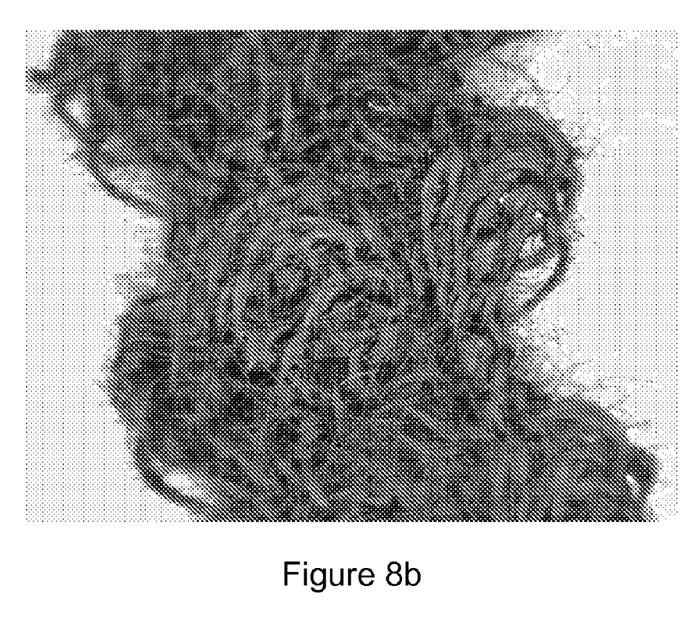
Figure 9A:
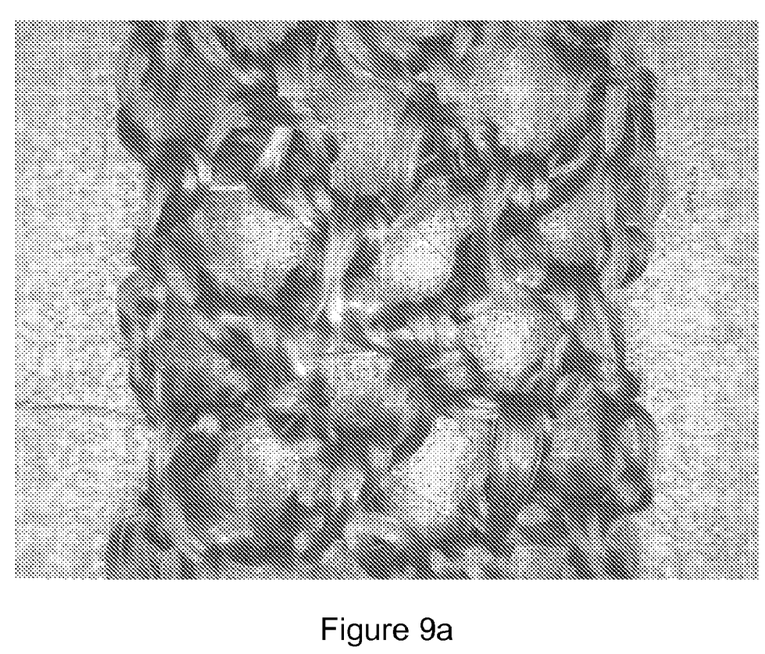
FIGS. 9a and 9b show the fabrics formed by filament yarn and stable yarn, respectively, in net (mesh) structure.
Figure 9B:
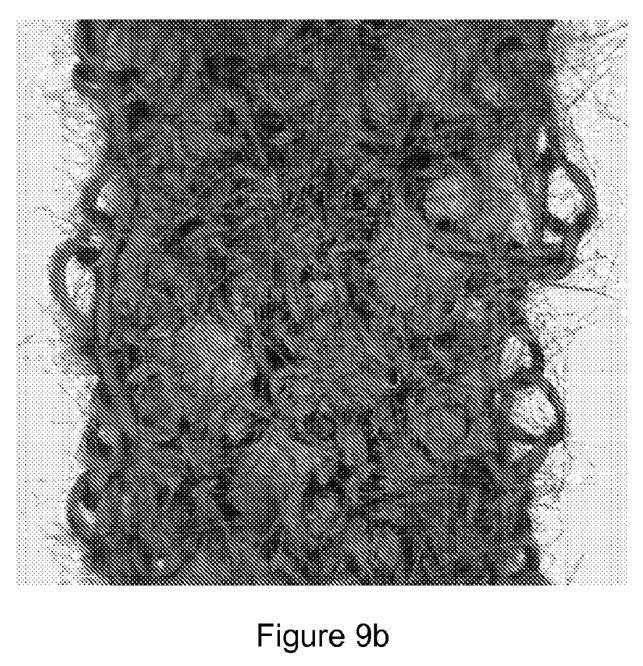
Figure 10A:
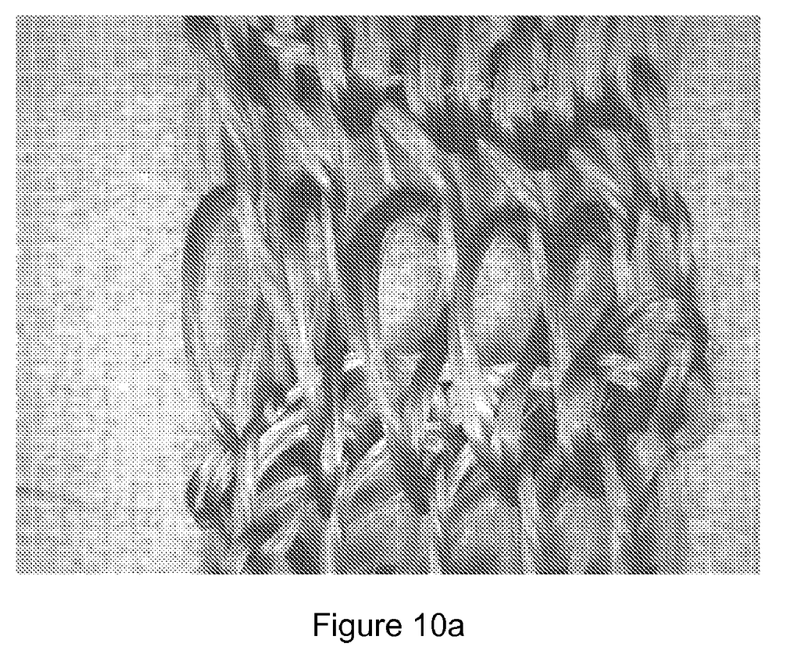
FIGS. 10a and 10b show the fabrics formed by filament yarn and stable yarn, respectively, in fancy long stitch structure.
Figure 10B:
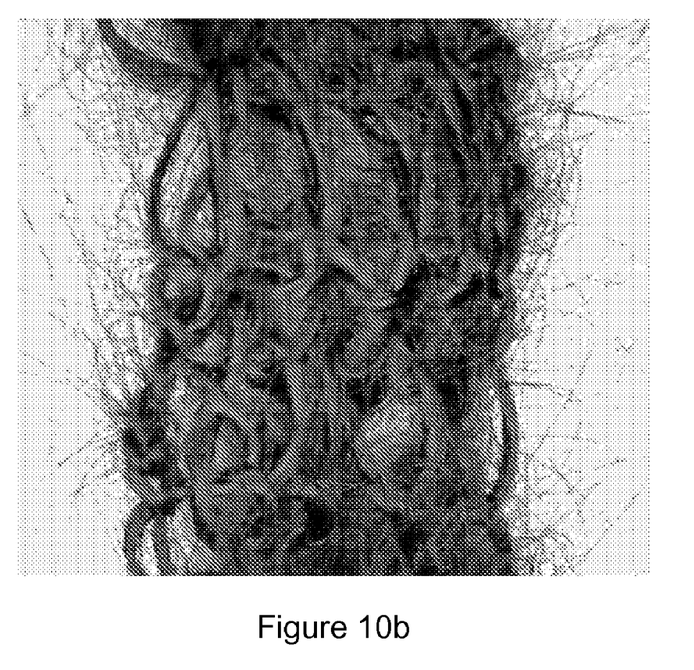

In the contacting region, the fibers comprising the yarn entangled with each other. When a voltage is applied on the two contacting yarns, the current reach one of the yarns to another one through the multi-contacting region. The circuit can be simulated by using a circuit in FIG. 6.

The yarns at the multi-contacting regions form a large amount of contacts. When the load is applied to the contacting regions, more contacts between fibers will be created in these yarns contacting regions, thus shortening the length of the current paths and construct more current circuit paths. As a result, contacting resistance between yarns is decreased. Therefore, it is important to design recoverable structures that the contacting points can be disconnected after the recovery of the deformation to guarantee the repeatability of the resistance change of the sensor. The feature of interlocking rings is one key factor. This can be further enhanced by using high bending modulus fibers, distorting fibers into puff assemblies by physical, chemical deformation or designing elastic yarn/fabric structures at the contacting regions.

For short fiber yarns, to create more contacting points at the contacting regions in the fabric and endow the contacts with elastic properties, several methods can be used:
1) Shorten the fiber length before spinning to create more between fibers contacts.
2) Use texture short fibers such as cutting from textured filaments or deform the short fiber directly by physical or chemical process such as heat treatments, heat pressure, etc.
3) Fabricate the yarn with low twist.
4) Scrub the short fiber yarn by sand paper or grinding wheel to create hair around yarn surface.

For filament yarn, to create more contacting points at the contacting regions in the fabric and endow the contacts with elastic properties, several methods can be used:
1) Texture filament in a crimple structure by physical or chemical treatments such as draw texture, air-jet texture, false twist texture, knit-unknit texture, alkali treatment etc.
2) Fabricate the yarn with low twist.
3) Scrub the short fiber yarn by sand paper or grinding wheel to create hair around yarn surface.

The contacting and length resistances are connected in the format of fabric structure. Besides the multi-contacting structure of contacting yarns, the sensor characteristics are also governed by the fabric structure. The fabric structure determines the deformation ability, strain range, specification and shape of the sensor. As to sensitivity of the sensor, increasing the contacting numbers for a given length of the fabric can improve the sensitivity. This can be achieved by 1) increasing the fabric density, 2) using small diameter fibers, etc. As to strain range, i.e., the deformation ability of the sensor, it can be achieved by 1) fabricating the fabric into knitted, crocheted structures that have good deformation abilities or 2) using elastic structure fiber/yarn by physical or chemical treatments or 3) decreasing the fabric density. As to sensor specifications, it can be 1) fabricated into a thin rope like with the width less than 1 mm by crocheting, knitting or braiding and 2) large area piece as carpet by knitting or woven. As to sensor shape, it can be fabricated into 1) plane by knitting, crocheting, woven or no-woven, etc or 2) into tubular, lace like by knitting or crocheting. All the characteristics of the sensor can be adjusted by designing suitable fabric structure. Meanwhile, in order to highlight the contacting resistance in the fabric and prevent the slippages of the yarn, which enlarge the hysteresis of the sensor, the fabric structure should be designed in a relative stable format. Some representative structures are shown in FIGS. 7-10, in which the interlocking rings are formed by a collective strand of electrically conductive yarns, wherein the yarns orient substantially along a same direction.

For the single warp structure (shown in FIG. 1), the total resistance may be expressed as Equation 1:

$$R_{Total\ Resistance} = \Sigma R_{contacting} + \Sigma R_{length\ Resistance} \quad (1)$$

Therefore the change of the resistance can be express in Equation 2:

$$\Delta R_{Total\ Resistance} = \Delta(\Sigma R_{contacting}) + \Delta(\Sigma R_{length\ Resistance}) \quad (2)$$

The contacting resistances and the length resistance (each unit loop) are in series connections. The advantage is that if each contacting resistances and length resistances are in linear relationship of resistance and strain, the total resistance of the fabric should exhibit linear relationship.

Figure 11:
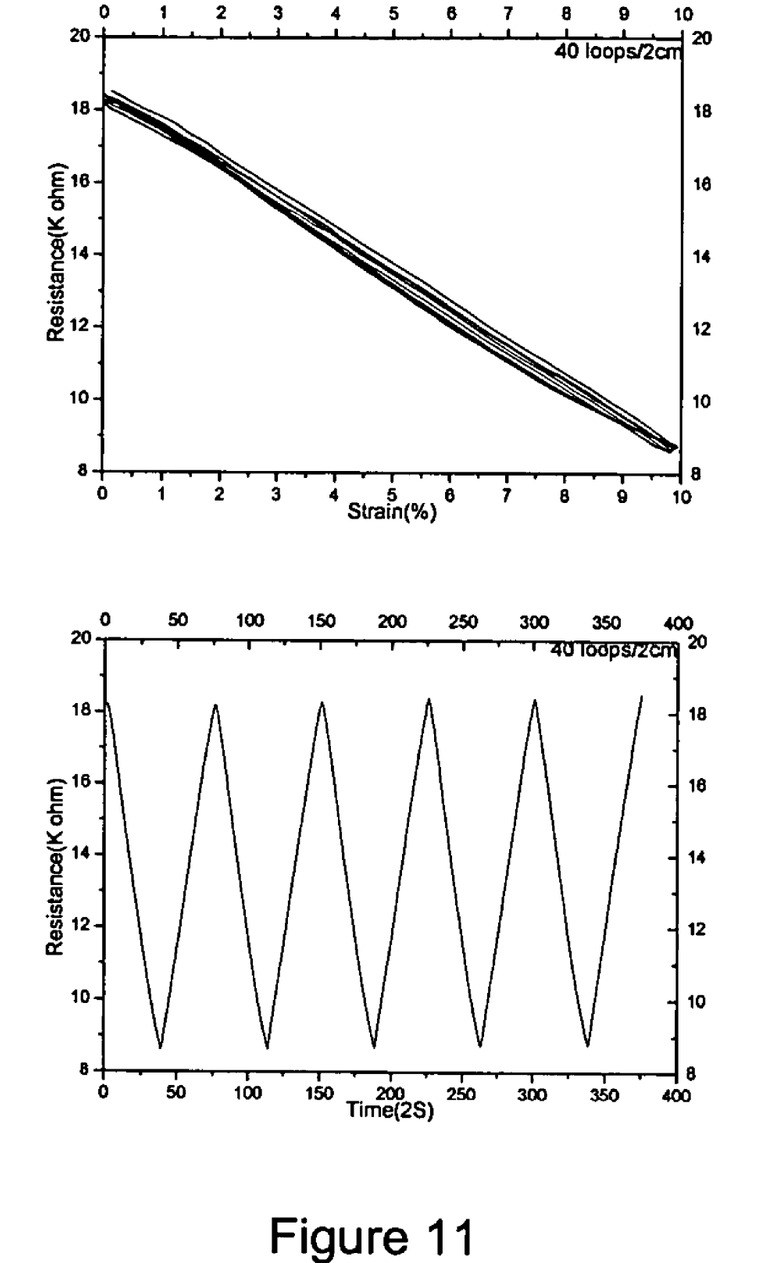
FIG. 11 shows the resistance to strain relationship of the fabrics of FIG. 1.

Therefore, the structure like single warp that constructs all the contacting resistances and length resistances in a series connection is preferred. The relationship between the resistance and strain of one crocheted fabric sample is shown in FIG. 11 (sample shown in FIG. 1).

The experimental results of the single warp structure sensor are shown in Table 1 (carbon staple fiber)

TABLE 1

| | |
|---|---|
| Axial Strain Sensitivity (Gauge Factor) | 5.6 |
| Linearity (Linear Regression Correlation Coefficient) | 0.9982 |
| Maximum Hysteresis of 5 cycles | 2.3% |
| Maximum Strain Range | 35% |
| Maximum Using Temperature (atmosphere) | 400□ |
| Chemical Stability (Immerging in Water, PH = 14, 100□, 30 mins) Maximum Change of Resistance | 1% |
| Chemical Stability (Immerging in Water, PH = 1, 100□, 30 mins) Maximum Change of Resistance | 1% |

For some special electrical conductive fibers/yarns such as carbon, silicon or the same, which are in difficult to undergo textile processing due to their poor bending properties and fragility, the precursor materials may first be fabricated into textile structure and then imparted conductive properties by physical or chemical processes such as high temperature carbonization, highly acidic solvents processing, etc.

Sensitivity-loop Density Relationship

In general, the strain sensitivity of a sensor is represented by a gauge factor, defined as the fraction of the increment in its electrical resistance $\Delta R/R_0$ per unit strain; that is, $$K(\text{gauge factor}) = \frac{\Delta R/R_0}{\varepsilon}, \quad (3)$$

where $R_0$ and $\Delta R$ are the initial resistance and the change in the resistance, respectively, and $\varepsilon$ is the applied strain.

According to Eq. (3), the average strain sensitivities of the different loop densities are shown in table below for the single warp II structure (FIG. 3)

| Fabric Density | 15 loops/2 cm | 22 loops/2 cm | 40 loops/2 cm |
|---|---|---|---|
| Gauge Factor | 2.2 | 3.5 | 5.6 |

The average gauge factor increases with the increase of loop density and is almost in direct proportion to the density. This may be due to the conducting mechanism, in which the change of the fabric resistance is mainly caused by the serially connected yarns' contact resistances. As a higher density can provide more such contacts within a given length, it therefore increases the strain sensitivity. However, the density is restricted by the jamming condition of the fabric. This is determined by the yarn diameter—small diameter may have bigger maximum density.

Single Layer Fabric Sensor for Pressure Distribution

Figure 12A:
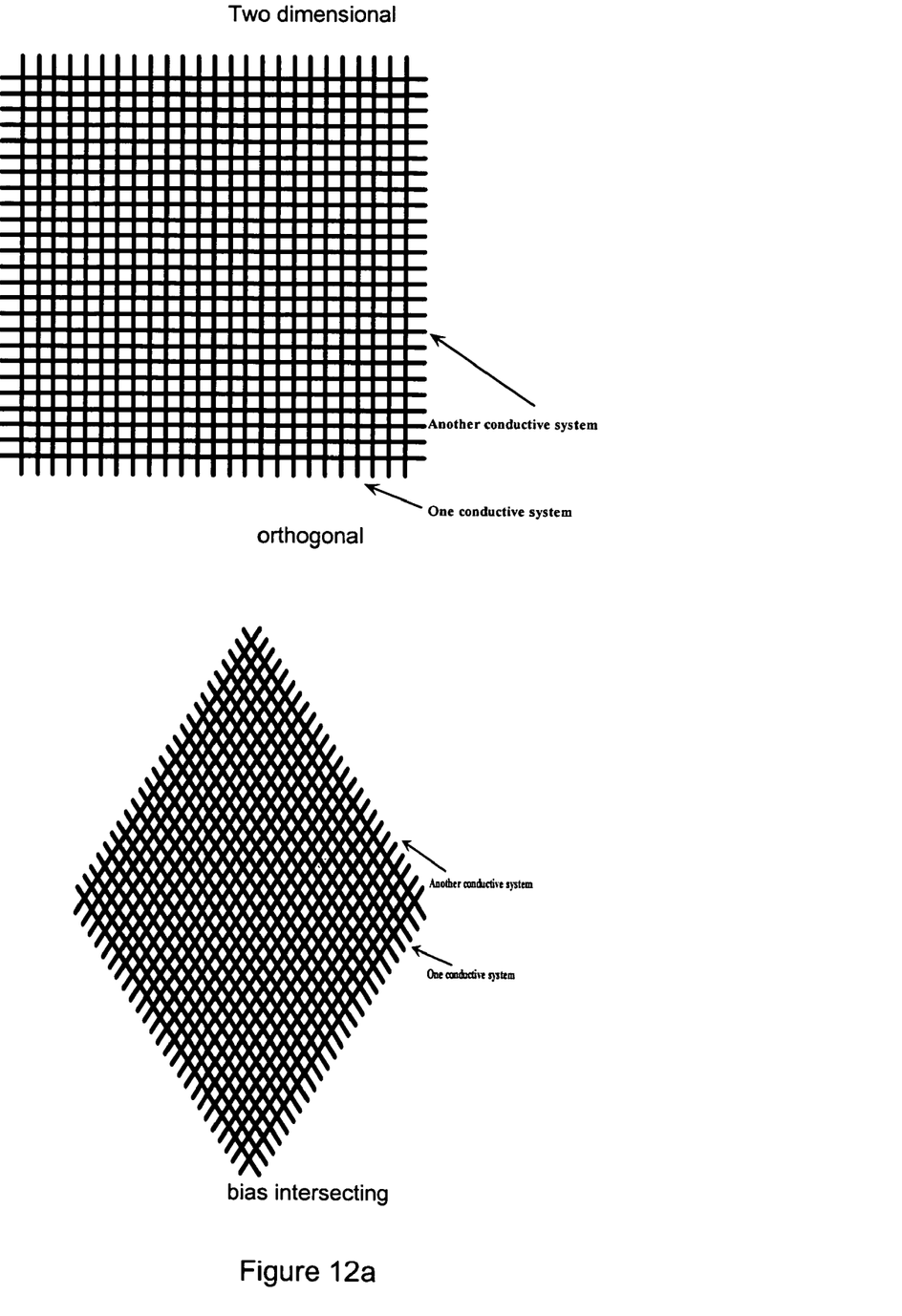
FIGS. 12a and 12b shows different patterns of the pressure-position fabric sensors of this invention.
Figure 12B:
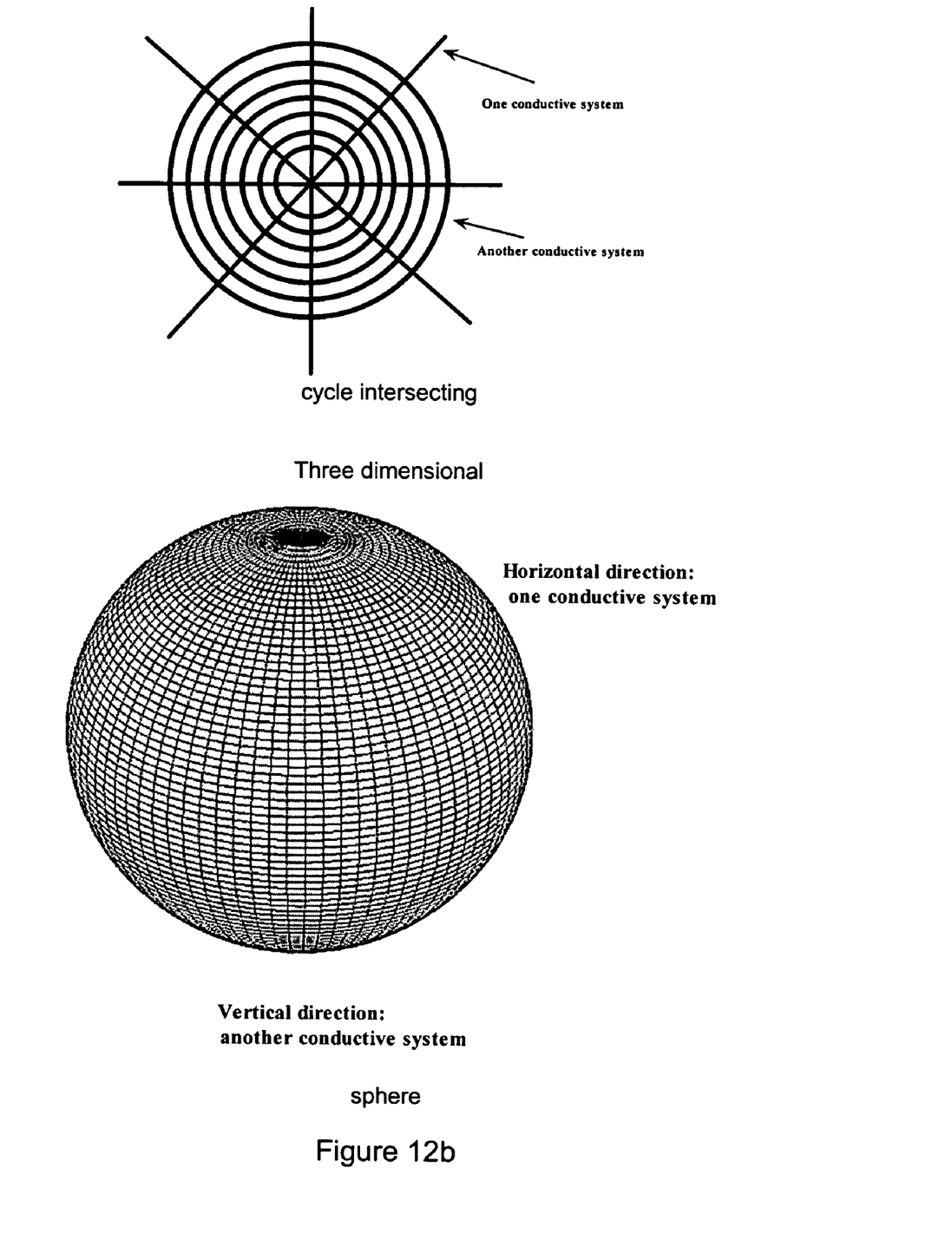

In another aspect of this invention, fabric pressure-position mapping sensors are also fabricated. These sensors make use of the multi-contacting structure of the yarns to detect both pressure and positions. FIG. 12 shows various possible structures of fabrics having a plurality of electrically conducting yarns intersecting at predetermined known positions. The grids of yarns are fabricated such that they intersect at predetermined positions. The pressure may be sensed at such intersecting positions according to the above discussed principle, and therefore, both pressure and positions may be determined as the predetermined positions are known. The structures shown in FIG. 12 are correspond to typical coordination systems so that the pressure-position mapping fabric sensors may be coordinated with a computer system more easily. However, other intersecting schemes are also possible provided that the positions of the intersecting points can be determined.

Figure 13:
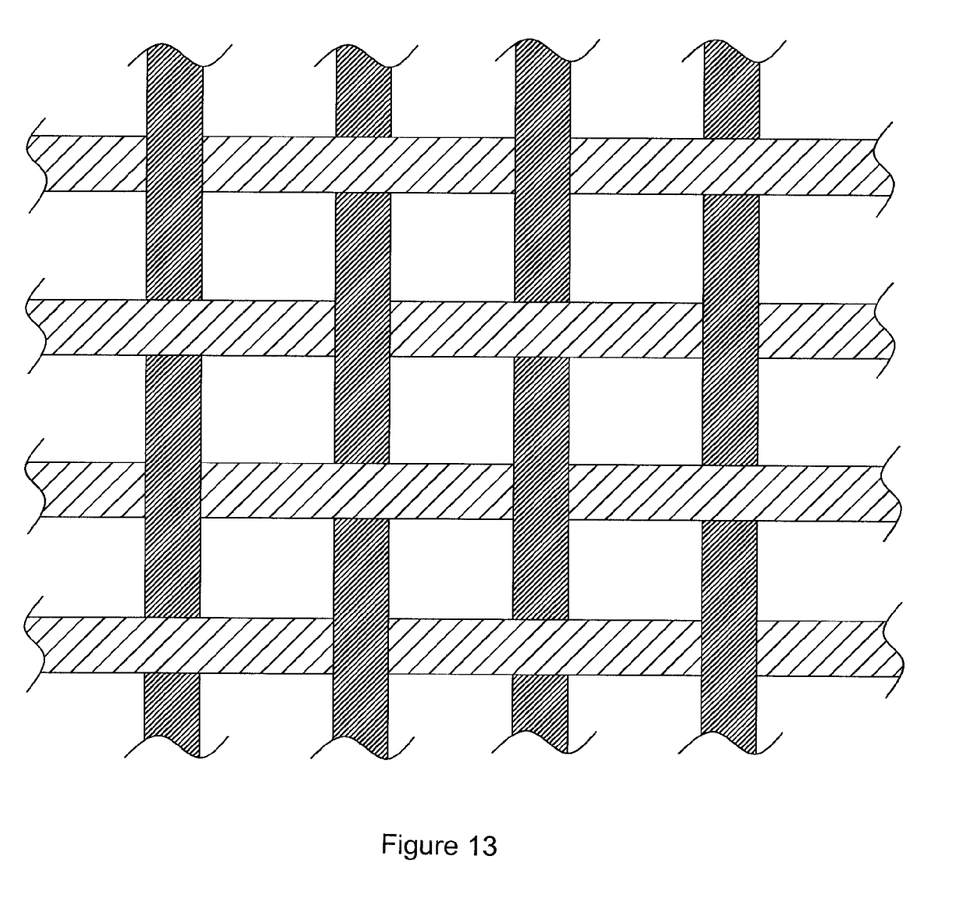

FIG. 13 shows an enlarged view of the orthogonal intersecting system. Due to the large number of intersections, the intersecting points are relatively stable. This is important as this represents a design recoverable structure that the contacting points can be disconnected after the recovery of the deformation. As discussed earlier, the pressure applied to the intersecting points may be measured in terms of the change in the contacting resistance at the intersecting points.

Figure 14:
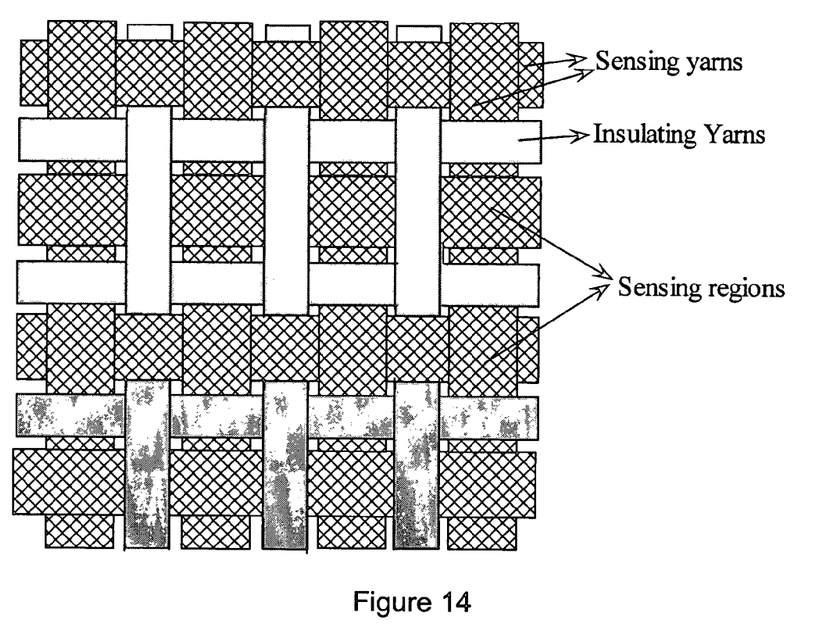
FIG. 14 shows a pressure-position fabric sensors furthering incorporating insulating fabrics.

A particularly preferred embodiment of the pressure-position fabric sensor of this invention is shown in FIG. 14. The sensing yarns, the pressuring sensing fabrics as described above, interlaces with the insulating fabrics. Accordingly, the overall structural stability of the fabric sensor is enhanced.

These two orthogonally interlaced systems in the pressure sensor are not limited to fabrics, very thin fabric structures such as rope like, belt like, lace like, etc fabricated by crocheting, braiding, knitting can also be employed to increase the sensitivity, mechanical properties, stability, etc.

In the pressure fabric sensor of FIG. 14, two systems, i.e., weft and warp yarns/thin fabrics are woven orthogonally, which create the regularly distributed yarns multi-contacting regions in the fabric plane. The conductive fabrics used for either one of the warp and weft parts are arranged in parallel to each other with intervals with insulating parts to prevent the complete contact between the adjacent conductive parts. The principle of measuring the pressure position and magnitude are described in FIG. 15.

Figure 15:
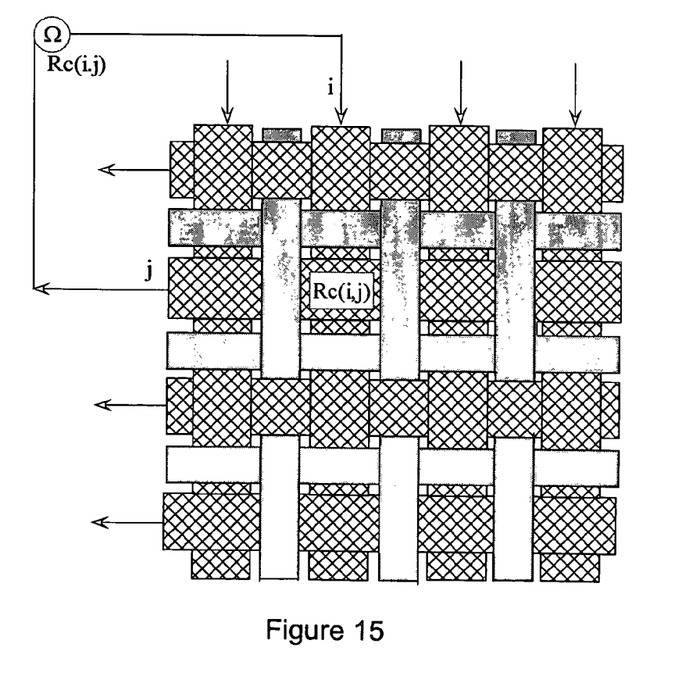
FIG. 15 shows how the resistance may be measured at one particular intersecting point.

When one electrode of the voltages is applied on one of the fabrics system, currents will reach another system through the contacting regions by the multi-contacting points. By measuring the resistance between the horizontal fabric and vertical fabric, one may detect the position and magnitude of the pressure applied on the fabric sensor simultaneously by testing the position where the change of the contacting resistance occurred and its value. Pressure can be mapped in real-time by detecting each contacting resistances in the fabric using a circuit network wired to the data processing devices through analog I/O channels. The pressure can be expressed by a visible mode such as image through analog and computing devices.

Protective Sheath

To protect the humidity or other external factors affect the sensing of the fabric, the fabric should be coated or laminated with a protective flexible films such as silicon rubber, PU or other elastomers. Of course this is an additional protection mechanism Electrode Connection and Wiring of the Strain and Pressure Sensors.

The proposed fabric strain and pressure sensors can be wired to the data processing devices in the practical use. In order to maintain well contacts between the sensor and the data processing devices while maintaining flexibility and comfort of the measurement system, the wire materials and connection methods should be considered in view of practical application environment. This is a design and shall be determined by the person involved.

The strain sensor can be connected to the data processing devices by flexible electrical conductive fibers, yarns or thin fabrics to keep the flexibility. The connectors should be coated with electrical insulating materials such as synthetic polymers or warped by flexible electrical insulating materials such as fibers or yarns by textile processes such as braiding, warping spinning, etc. to prevent the unexpected electric contacts. The connection between the sensor and the wire can be achieved by electrical welding or electrical conductive glue or mechanical pressure contacting or textile processes such as warped connections to make the contacts between the wire and the sensors. The methods contacting the pressure fabric sensor to the data processing system are the same as the strain sensor connection mentioned above except analog I/O channels devices are needed to connect the column and line systems to the processing device system for easy use.

These conductive textiles mechanical sensors mentioned above make use of the change of the electrical resistance to the mechanical deformation. However, the previous inventions provide sensors of high environmentally stability, high strain sensitivity and linearity, low hysteresis by employing single layered fabric structure with pure intrinsically conductive material that real wearable, tailorable with low cost and simple fabrication processes, more important, can be used in some harsh environments such as high temperature, high humidity, chemical environments, etc in industry testing fields such as strain gauges.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A pressure or strain sensing fabric, the fabric comprising at least one elongate electrically conductive yarn, wherein one or more of said electrically conductive yarns is arranged as a series of loops of the same yarn, at least one of the loops of said series of loops of said one or more yarns being interlocked with another loop of said series of loops; wherein the loops are interlocked in a manner such that the contact area between adjacent loops can be altered so as to alter the electrical resistance along the length of the yarn.

2. The fabric of claim 1, wherein the yarn comprises staple fiber yarn.

3. The fabric of claim 1, wherein the yarn comprises filament yarn.

4. The fabric of claim 1, comprising a plurality of electrically conductive yarns, wherein each of the electrically conductive yarns forms interlocking rings.

5. The fabric of claim 1, wherein the fabric includes one or more strands formed from two or more yarns, a portion of the loops of one yarn being interlocked with loops of at least one adjacent yarn forming said strand.

6. A pressure and position sensing fabric including a first plurality of electrically conductive fabrics comprising a plurality of electrically conductive yarns, said electrically conductive yarns arranged so as to intersect at predetermined known positions, wherein one or more of said electrically conductive yarns is arranged as a series of loops of the same yarn, at least one of the loops of said series of loops of said one or more yarns being interlocked with another loop of said series of loops; wherein the loops are interlocked in a manner such that the contact area between adjacent loops can be altered so as to alter the electrical resistance along the length of the yarn.

7. The fabric of claim 6, wherein the yarns are provided so as to intersect in an orthogonal array arrangement.

8. The fabric of claim 6, wherein the yarns are provided so as to intersect in a non-orthogonal array arrangement.

9. The fabric of claim 6, wherein yarns are provided so as to intersect in a spherical array arrangement.

10. The fabric of claim 6 further including a first plurality of insulating fabrics including insulative yarns, wherein the electrically conductive fabrics are spaced apart from each other and the insulative fabrics are interwoven therebetween.

11. The fabric of claim 6, wherein the yarns are staple fiber yarns.

12. The fabric of claim 6, wherein the yarns are filament yarns.

13. The fabric of claim 1, wherein the loops are interlocked in a manner such that, upon a tensile load being applied to the yarn, a loop is urged away from an adjacent loop and such that a portion of the loop is urged against a portion of an adjacent loop so as to increase the contact area between the loop and the adjacent loop.

\* \* \* \* \*